United States Patent [19]
Martin

[11] Patent Number: 5,337,450
[45] Date of Patent: Aug. 16, 1994

[54] EASILY REMOVABLE FAUCET HANDLE

[76] Inventor: Paul E. Martin, 35 Milk St., Methuen, Mass. 01844

[21] Appl. No.: 982,637

[22] Filed: Nov. 27, 1992

[51] Int. Cl.⁵ .................. A47B 95/02; A47J 45/10; E05B 1/00; E05B 7/00
[52] U.S. Cl. .................. 16/114 R; 16/121; 16/DIG. 24
[58] Field of Search .............. 16/114 R, 117, 118, 16/DIG. 24, DIG. 41, 121

[56] References Cited

U.S. PATENT DOCUMENTS

| | | | |
|---|---|---|---|
| 2,142,791 | 1/1939 | Koza | 16/117 |
| 2,698,956 | 1/1955 | Thompson | 16/114 R |
| 2,773,437 | 12/1956 | Knauf | 16/121 |
| 4,593,430 | 6/1986 | Spangler et al. | 16/114 R |

Primary Examiner—Carmine Cuda

[57] ABSTRACT

A handle for turning on and off a faucet has a push button release for removal of the handle from a stem of the faucet structure. Pressing down upon the push button causes a latch attached to the handle to disengage from a slot in the stem allowing removal of the handle. Following removal of the handle, the faucet structure and/or the handle can be repaired and/or cleaned if necessary. The original handle or a new replacement handle can then be quickly and easily put back into place by reengaging the latch on the handle with the slot in the stem.

2 Claims, 4 Drawing Sheets

EASILY REMOVABLE FAUCET HANDLE

BACKGROUND OF THE INVENTION

1. Field of the Invention

The present invention relates generally to faucet structures, and more particularly, to a faucet handle apparatus which is easily removable from the rest of a faucet structure.

2. Description of the Prior Art

Faucet structures in the form of kitchen sink faucets, bathroom sink faucets, bath and shower faucets and valves, bidet valves as well as outdoor faucets and the like are well known in the art of water discharging devices. All of these and other faucet structures and/or water discharging devices have some type of handle for turning the water on and off such as the typical rotating handles generally used or levers which can be lifted and rotated or spindles which are also rotated. These handles are fastened to the stem of a faucet with a screw. Unfortunately, these screws often become rested or the threads on the screw become stripped. Both of these problems with the prior art faucet structures make it extremely difficult to remove the screw or the handle.

Prior art faucet handle structures are illustrated by the following U.S. Pat. Nos. 4,876,766; 4,796,329; and 4,065,216.

Although the foregoing body of prior art indicates it to be well known to use handles for turning faucets on and off, the provision of a more simple to remove device is not contemplated. Nor does the prior art described above teach or suggest a push button device on a faucet handle which may be used by individuals to quickly and easily remove the handle from the faucet structure. The foregoing disadvantages are overcome by the unique easily removable faucet handle of the present invention as will be made apparent from the following description thereof. Other advantages of the present invention over the prior art also will be rendered evident.

SUMMARY OF THE INVENTION

To achieve the foregoing and other advantages, the present invention, briefly described, provides a handle for turning on and off a faucet having a push button release for removal of the handle from a stem of the faucet structure. Pressing down upon or pushing the push button causes a latch attached to the handle to disengage from a slot in the stem allowing removal of the handle. Following removal of the handle, the faucet structure and/or the handle can be repaired and/or cleaned if necessary. The original handle or a new replacement handle can then be quickly and easily put back into place by reengaging the latch on the handle with the slot in the stem.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the preferred embodiment of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved easily removable faucet handle which has all of the advantages of the prior art and none of the disadvantages.

It is another object of the present invention to provide a new and improved easily removable faucet handle which may be easily and efficiently manufactured and marketed.

It is a further objective of the present invention to provide a new and improved easily removable faucet handle which is of durable and reliable construction.

An even further object of the present invention is to provide a new and improved easily removable faucet handle which is susceptible of a low cost of manufacture with regard to both materials and labor, and which accordingly is then susceptible of low prices of sale to the consuming public, thereby making such easily removable faucet handle available to the buying public.

Still yet a further object of the present invention is to provide a new and improved easily removable faucet handle which can removed and put back into place without the use of any tools.

It is still a further object of the present invention to provide a new and improved easily removable faucet handle having disengable engaging means to hold the handle to a stem of a faucet structure.

Still a further object of the present invention is to provide a new and improved easily removable faucet handle including a cap covering most of the top of the handle providing an attractive appearance while covering the details of the inside of the easily removable faucet handle.

Still yet a further object of the present invention is to provide a easily removable faucet handle having a cap which is held in place within the handle structure by glue.

Even still a further object of the present invention is to provide a easily removable faucet handle which can be quickly removed so that the handle and/or the rest of the faucet structure can be cleaned/and or repaired or replaced as is necessary.

It is yet even a further object of the present invention to provide a easily removable faucet handle which eliminates the need for a screw means to hold a faucet handle to a faucet stem.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENT

Figure 1:
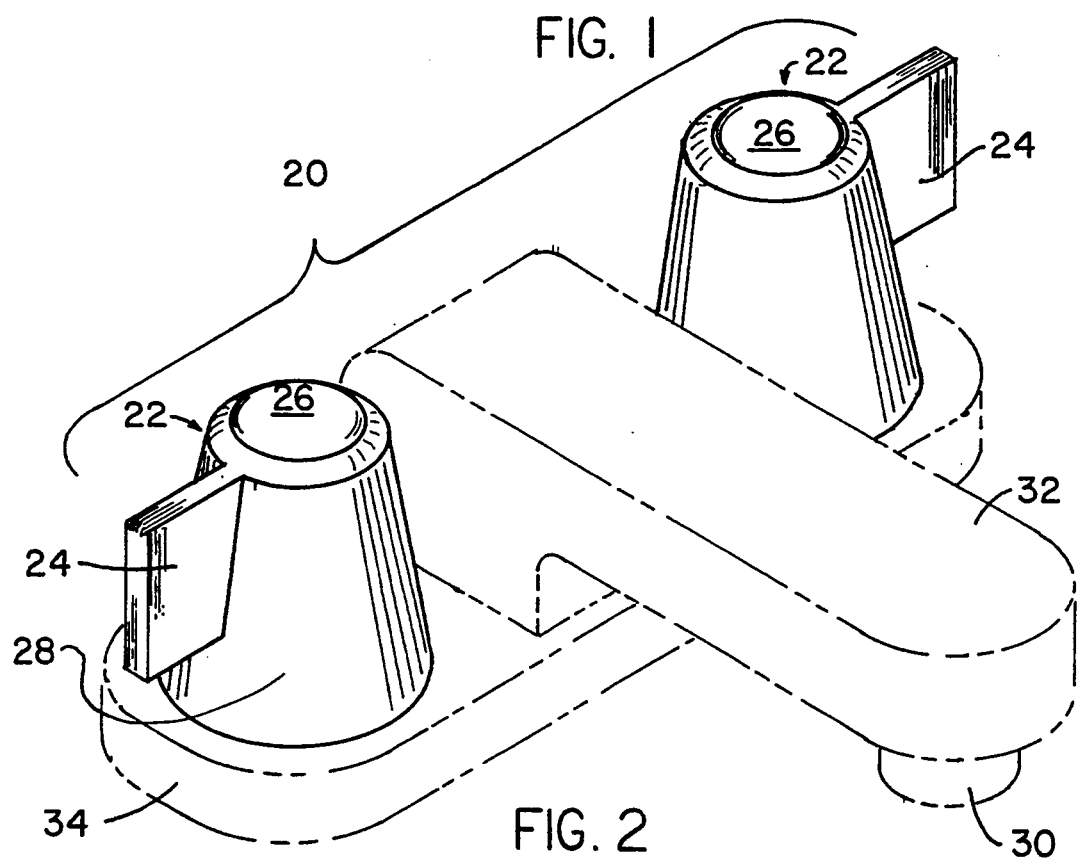
FIG. 1 is a perspective view showing part of the preferred embodiment of the easily removable faucet handle as part of a faucet structure of the present invention.
Figure 2:
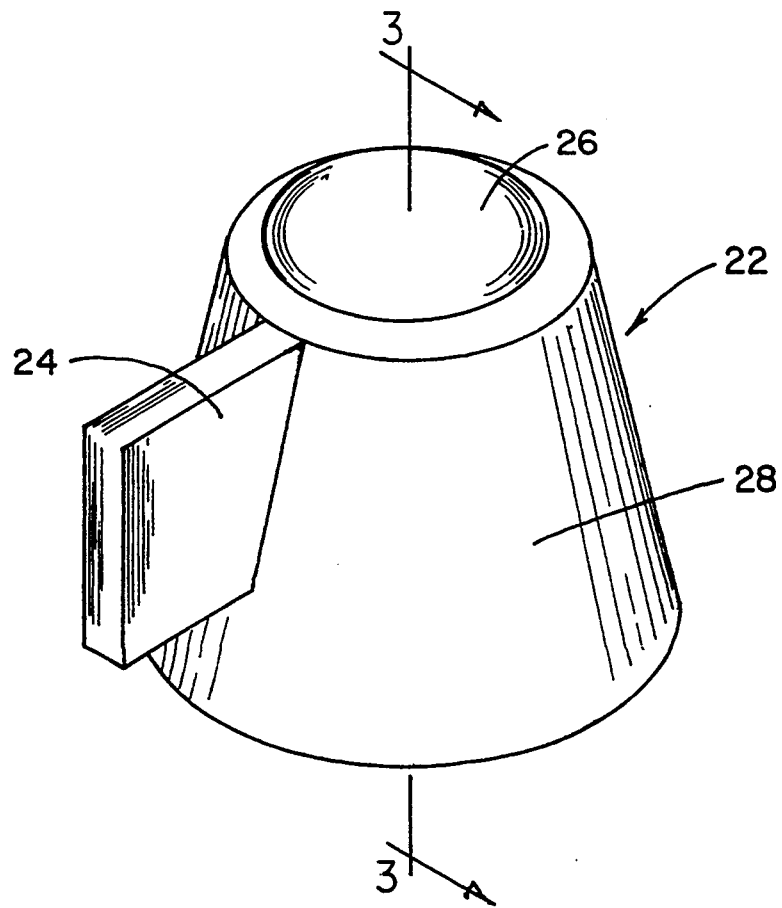
FIG. 2 is a perspective view of the easily removable faucet handle of FIG. 1 alone without the rest of the faucet structure.
Figure 3:
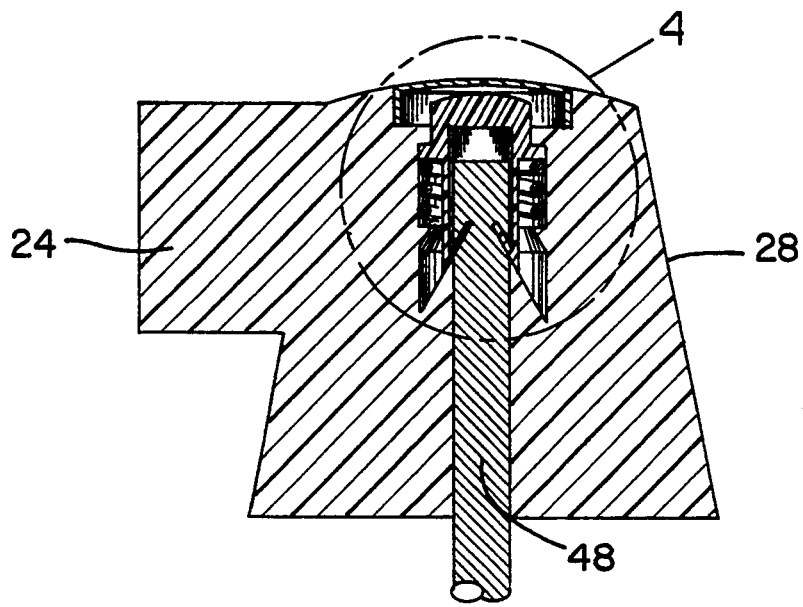
FIG. 3 is a cross-sectional view of the easily removable faucet handle of FIG. 2 taken along line 3—3 thereof to show the internal details of the preferred embodiment of the present invention.

With reference now to the drawings, a new and improved easily removable faucet handle embodying the principles and concepts of the present invention will be described.

Turning initially to FIGS. 1-4, there is shown a first exemplary embodiment of the easily removable faucet handle of the invention generally designated by reference numeral 22. A pair of easily removable faucet handles 22 are shown as part of faucet structure 20 in FIG. 1. In addition to the twin right and left (hot and cold) faucet handles 22, the faucet structure 20 of FIG. 1 also includes a spout assembly 32 at the end of which is a spout 30. The base of the faucet structure is escutcheon 34 which supports the spout assembly 32 and the handles 22.

Each faucet handle 22 has a main body 28 and a tab 24 fixed to the main body 28 for making it easier to turn the faucet on and off. A cap 26 covers the most of the top of the handle 22. The cap 26 covers the inner details of the handle apparatus providing an attractive appearance. While the cap 26 is not absolutely necessary to the present invention, it is highly preferred that a cap 26 be used to obtain the desirable attractive appearance it provides.

Figure 4:
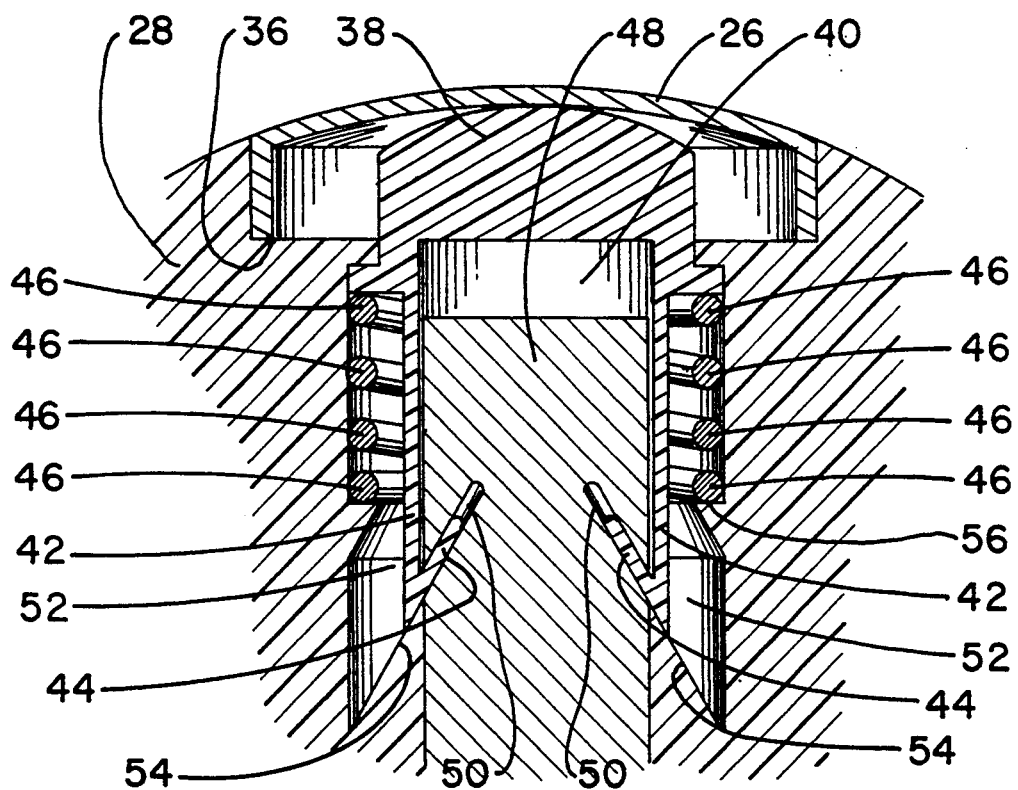
FIG. 4 is an enlargement of section 4 of the cross-sectional view of FIG. 3 to show the preferred embodiment of the present invention in even more detail.

Referring now particularly to FIG. 4, the cap 26 is held within an inset section 36 of the main body 28. A central hole 40 runs through the length of the main body 28. A push button 38 is fixed immediately under the cap 26 within the upper section of the central hole 40 through the main body 28. The handle 22 is intended to be easily removable from a stem 48 which fills much of the lower section of the central hole 40 in the main body 28.

The push button 38 has engaging grippers 42 or some type of somewhat flexible gripping or engaging means 42 for holding the push button 38 in place removably attached to the stem 48. The upturned sections 44 of the engaging grippers 42 engage the engagement notches or slots 50 in the stem 48. A spring 46 forces the push button 38 upwards away from the stem 48, but the upturned sections 44 of the grippers 42 hold the push button 38 in position.

The central hole 40 has wide sections 52 with tapered angle sections 54 to help make removal and replacement of the handle easier.

Using the present invention, removal of the handle 22 from the faucet structure 20 is very easy and can be done very quickly. A user of the faucet who wishes to remove a handle 22 pushes down with a finger against the cap 26. The cap 26 in turn pushes down the push button 38 with a force against the spring 46. The upturned sections 44 of the engaging grippers 42 move out of the engaging slots 50 in the stem 48 and down against the tapered angle sections 54 of the wide sections 52 of the hole 40. Once the tips of the upturned sections 44 of the grippers 42 get past the end of the slots 50, the handle 22 can be pulled off of the stem 48 and thus off of the faucet structure 20. This removal step can be made easier with an optional slight rotational movement against the cap 26 which will cause the upturned sections 44 to rotate away from the slots 50, making removal of the handle 22 even easier.

While the handle 22 is removed, the rest of the faucet structure 20 and/or the removed handle 22 can be cleaned and/or repaired and or replaced as is necessary.

Figure 5:
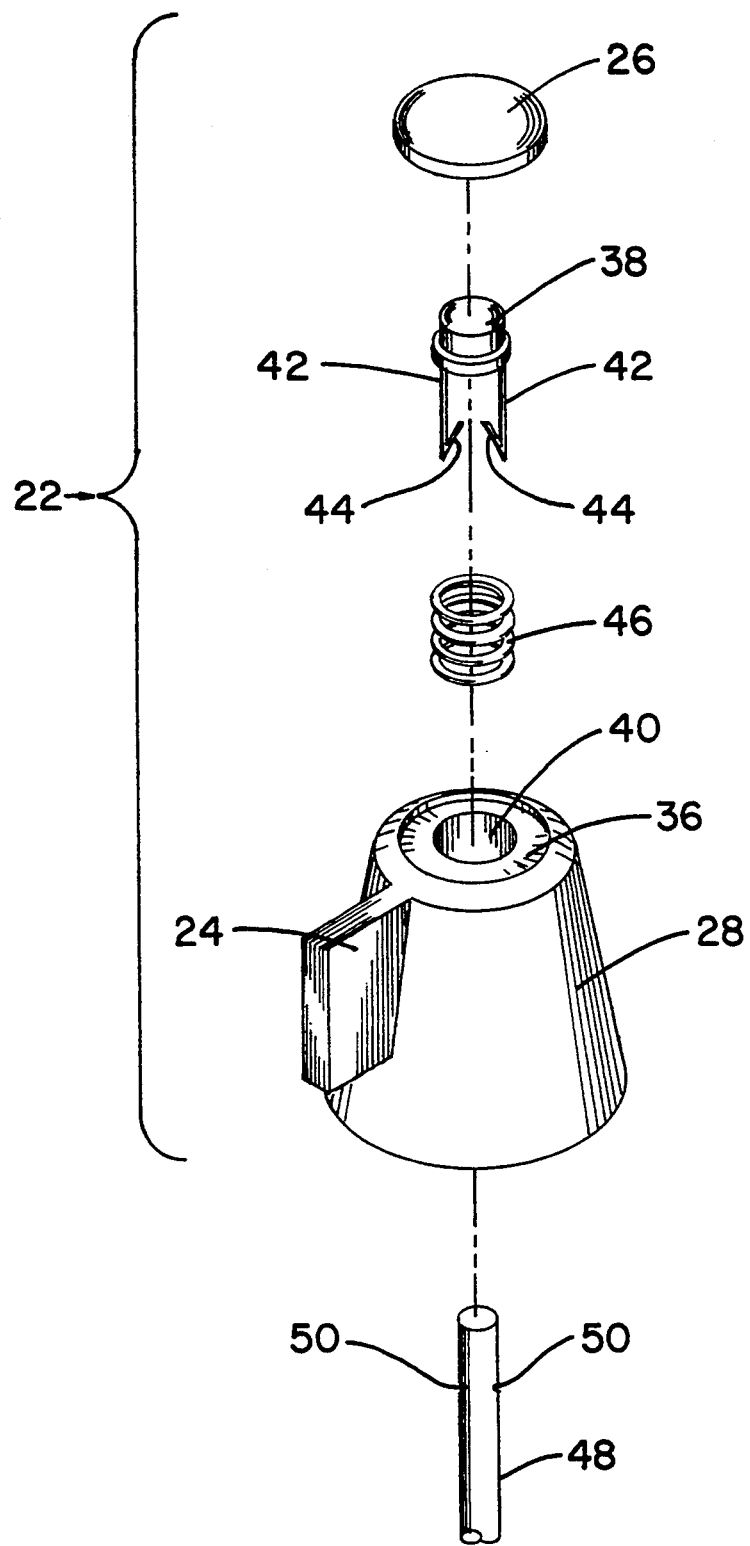
FIG. 5 is a perspective view showing the separated individual parts of the preferred embodiment of the present invention.

Replacement of the handle 22 with the same or a substitute handle 22 is equally easy using the present invention. Referring to FIG. 5, which shows separated all of the parts of the preferred embodiment of the present invention, the main body of the handle 28 is placed over the stem 48, with the stem coming up through the bottom of the central hole 40 in the main body of the handle 28. The spring 46 is placed through the top of the hole 40 and the bottom of the spring 46 comes to rest against ledge 56 (see FIG. 4). The push button 38 is then fed through the spring 46 within the central hole 40 until the upturned sections 44 of the engaging grippers 42 get to the openings of the engaging slots 50 in the stem 48. Once the upturned sections 44 get to this point, slowly allowing the pressure of the spring 46 to push the push button 38 up will allow the upturned sections 44 to slowly move into the engaging slots 50 in the stem 48 eventually reaching their fullest extension at which point the push button 38 is firmly held in position.

Figure 6:
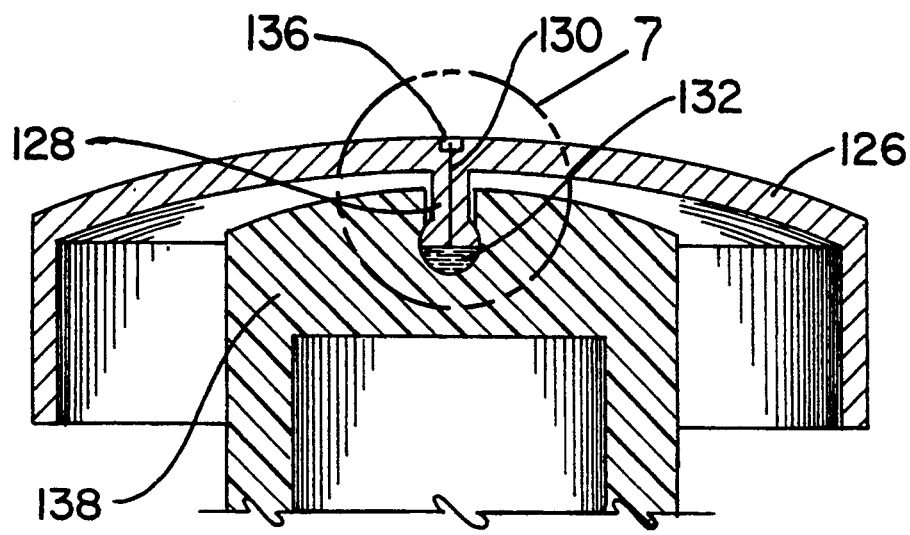
FIG. 6 is a cross-sectional view of an alternative embodiment of a construction for attaching a cap to a push button of an easily removable faucet handle all in accordance with the present invention.
Figure 7:
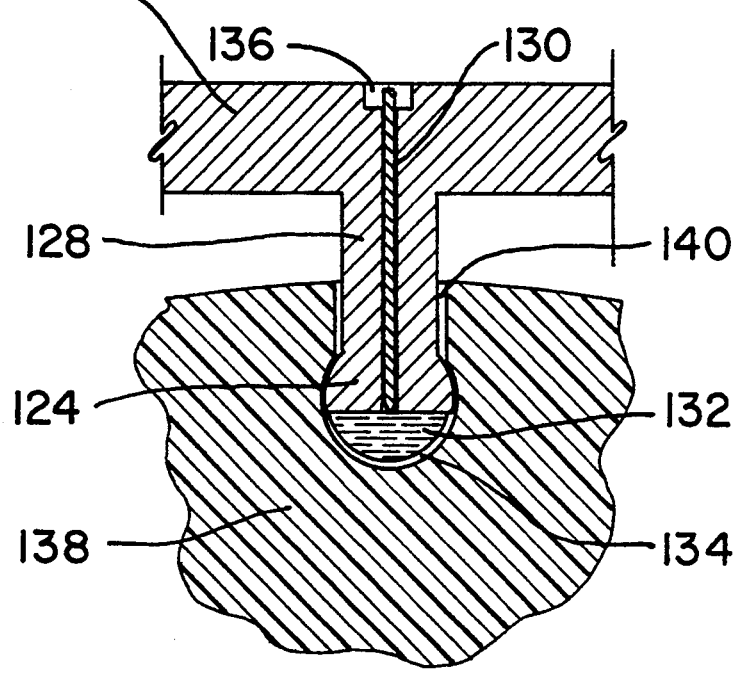
FIG. 7 is an enlargement of section 7 of the cross-sectional view of FIG. 6 of the alternative embodiment of the cap attaching construction for the easily removable faucet handle in accordance with the present invention.

FIGS. 6 and 7 show an alternative embodiment of the present invention for holding the alternative cap 126 in place. In the first embodiment the cap 26 is preferably held in position by a tight frictional fit. In this second embodiment, cap 126 has a bulbous end 124 at the end of an elongated extension 128. The elongated extension 128 and the bulbous end 124 tightly fit within a central top hole 140 in the push button 138. A puncturable sack of glue 132 is fixed to the bottom of the bulbous end 124. A needle 130 runs through the center of the extension 128 and the bulbous end 124.

Using this second embodiment to attach the cap 126 to the push button 138 is very easy. The elongated extension 128 of the cap 126 having the bulbous end 124 and the glue sack 132 at the end is fed through the top central hole 140 in the push button 138. A small amount of space 134 will likely be left between the bottom of the glue sack 132 and the push button 138. Pushing down slightly on the cap 126 (not enough to disengage the gripping means from the slots as described in the FIG. 1-5 embodiments) will puncture the glue sack 132 causing the glue to fill up the space 134 so that, after it hardens, the glue will fix the cap 126 to the push button 138.

The various parts of the present invention can be made of any practical material now known or known in the future. It is expected that such choices of material will be based on cost, durability and resistance to corrosion factors. Many metals and plastics are suitable for use as parts of the present invention. The engaging gripped section 42 should be made of a material having at least a slight flexibility such as the flexibility many metals and plastics provide.

The present invention can be used with any type of faucet having a means for turning the liquid flow on and off.

A protective piece 136 can be placed at the central section of the top of the cap 126 to prevent the top of the needle from puncturing the skin of the user. Any hard protective material could be used for this purpose such as metal.

The present invention push button release makes it easy to remove the handle for repairing the faucet and cleaning under the handle where soap build up is visible but is hard to reach. A new stem (spindle) could accompany the handle to interchange more easily to create a new look on the faucet.

While the invention has been described above in its preferred embodiment for use with a two handle (hot/cold) faucet structure, the invention would work equally well with any type of faucet structure having an on/off handle or valve. The present invention could be used on kitchen, bathroom and other sink faucets, shower and bath valves and bidets, and any other type of valve or faucet to which a quick release valve would be helpful. Since the handles can be easily removed, the invention could be used on outside faucets so unauthorized persons could not use the water without permission.

An advantage to the present invention is that no tools or screws are required to take the handle off or put it back on.

It is apparent from the above that the present invention accomplishes all of the objectives set forth by providing a new and improved easily removable faucet handle for mining on and off a faucet having a push button release for removal of the handle from a stem of the faucet structure. Pressing upon the push button causes a latch attached to the handle to disengage from a slot in the stem allowing removal of the handle. Following removal of the handle, the faucet structure and/or the handle can be repaired and/or cleaned if necessary. The original handle or a new replacement handle can then be quickly and easily put back into place by reengaging the latch on the handle with the slot in the stem.

A new and improved easily removable faucet handle in accordance with the present invention is comprised of:

a main body of the handle having at least one or more engaging means; a stem having at least one or more engagement notches corresponding to the at least one or more engaging means in the main body of the handle; a resilient means such as a spring for holding the engaging means of the main body in temporary engagement with the at least one engagement notch of the stem; and a push button which can be pushed against the force of the spring to cause the engaging means to disengage from the engagement notch.

The present invention engaging means can be reengaged with the engagement notch after the push button has been pushed or pressed to cause the engaging means to disengage from the engagement notch.

The invention can further be comprised of a cap for covering most of the top of the handle, the cap positioned adjacent to the push button such that pressure on the cap will push down on the push button.

The engaging means of the invention can further be comprised of at least one engaging gripper having an upturned section.

The at least one engaging means of the present invention can be more than one engaging means and the at least one engagement notch can be more than one engagement notch.

The at least one engaging gripper having an upturned section of the present invention can be more than one engaging gripper having an upturned section.

The cap of the present invention can be glued to the faucet handle.

Using the present invention, the faucet handle can be quickly and easily removed from the stem.

With respect to the above description, it should be realized that the optimum dimensional relationships for the parts of the invention, to include variations in size, materials, shape, form, function and manner of operation, assembly and use, are deemed readily apparent and obvious to those skilled in the art. Therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved faucet handle adapted to be easily installed on and removed from the stem of a flow control valve having at least one engagement notch comprised of:
   a handle main body, said handle main body defining a central recess having first and second annular shoulders disposed therein in an axially spaced relation, said stem adapted to be axially received within said recess with said annular shoulders surrounding said stem;
   a push button disposed in said recess, said push button having an annular flange engageable with said first annular shoulder in a first position thereof;
   at least one stem engaging means attached to said push button;
   resilient means disposed in said recess between said first and second annular shoulders for holding said stem engaging means of said push button in temporary engagement with said at least one engagement notch of said stem;
   wherein said resilient means comprises a spiral spring coaxially positioned about said stem within said recess, said spring having a pair of opposed ends, one of said opposed ends engaging said annular flange of said push button and the other of said opposed ends engaging said second annular shoulder said handle main body central recess extending beyond said at least one engagement notch in said stem to form a ramp aligned with said at least one engagement notch, and
   said at least one stem engaging means extending toward said ramp in said recess, said at least one stem engaging means having a distal end portion for engaging said ramp and said engagement notch in response to a resilient force applied by said spiral spring along the axis of said stem whereby movement of said push button along the axis of said stem to a second position is adapted to compress said spiral spring and cause sliding movement of said distal end portion of said at least one engaging means along said ramp into said recess to thereby release said distal end portion from said engagement notch and permit said push button, said main handle body, said spiral spring and said at least one stem engaging means to be axially removed from said stem.

2. The invention of claim 1 wherein said ramp and said at least one engagement notch is disposed at an acute angle with respect to said stem central axis.

* * * * *